(No Model.) 3 Sheets—Sheet 1.

D. T. KNOX.
MACHINE FOR CUTTING BLOCK SOLES.

No. 558,964. Patented Apr. 28, 1896.

WITNESSES
A. D. Harrison.
H. P. Abell.

INVENTOR
David T. Knox
by Wright Brown & Quinby
Attys.

(No Model.) 3 Sheets—Sheet 2.

D. T. KNOX.
MACHINE FOR CUTTING BLOCK SOLES.

No. 558,964. Patented Apr. 28, 1896.

WITNESSES
A. D. Harrison
W. R. Abell

INVENTOR
David T. Knox
by Knight Brown & Quinby
Attys.

(No Model.) 3 Sheets—Sheet 3.

D. T. KNOX.
MACHINE FOR CUTTING BLOCK SOLES.

No. 558,964. Patented Apr. 28, 1896.

UNITED STATES PATENT OFFICE.

DAVID T. KNOX, OF LYNN, MASSACHUSETTS.

MACHINE FOR CUTTING BLOCK-SOLES.

SPECIFICATION forming part of Letters Patent No. 558,964, dated April 28, 1896.

Application filed July 1, 1895. Serial No. 554,531. (No model.)

*To all whom it may concern:*

Be it known that I, DAVID T. KNOX, of Lynn, in the county of Essex and State of Massachusetts, have invented certain new and useful Improvements in Machines for Cutting Block-Soles, of which the following is a specification.

This invention relates to machines for cutting block-soles, or soles which are cut to an approximation of their final shape by curved knives acting on a strip of sole-leather the width of which is equal to the length of the sole, two knives being employed, one of which is curved to form one edge of the sole, while the other is curved to form the other edge of the sole. Said knives coöperate with a cutting-bed in cutting the strip of leather into transverse sections, each constituting a sole, each knife forming an edge of two soles.

The object of my invention is to provide a machine of this class adapted to cut either "straight" or "right" and "left" soles by the same mechanism and without change of knives. The invention also has for its object to enable the same pair of knives to cut right and left soles with varying degrees of offset in their curves.

To these ends the invention consists in the improvements which I will now proceed to describe and claim.

Figure 1:
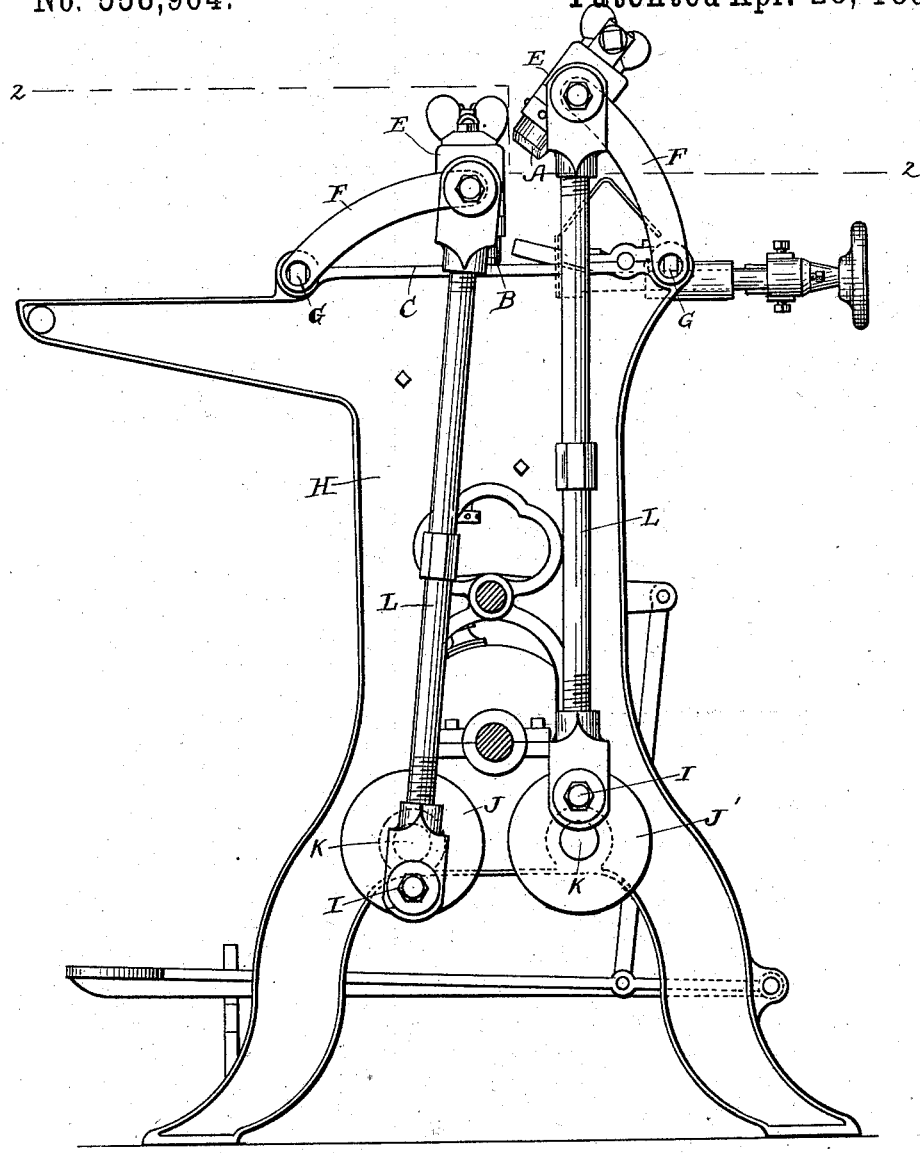
Figure 2:
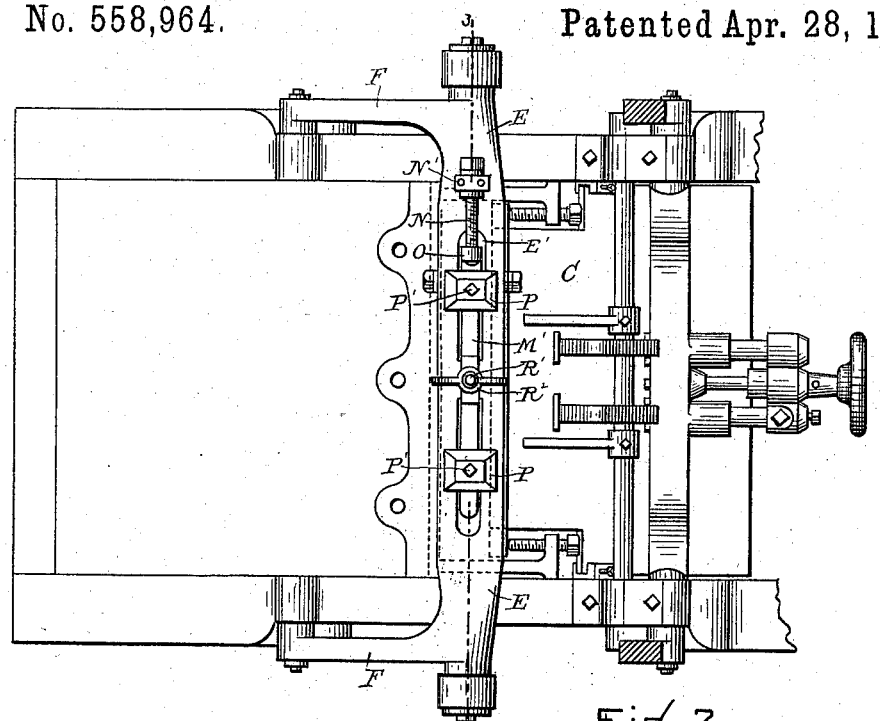
Figure 3:
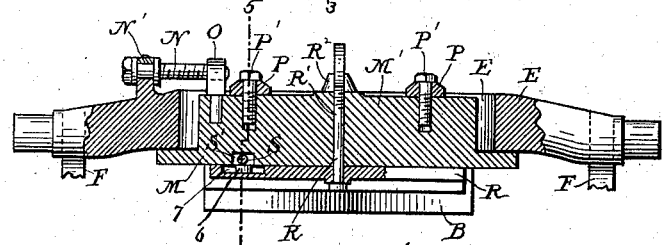
Figure 4:
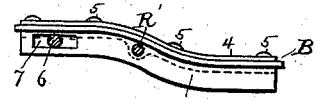
Figure 5:
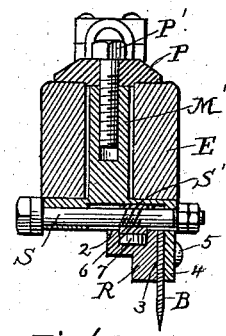
Figure 6:
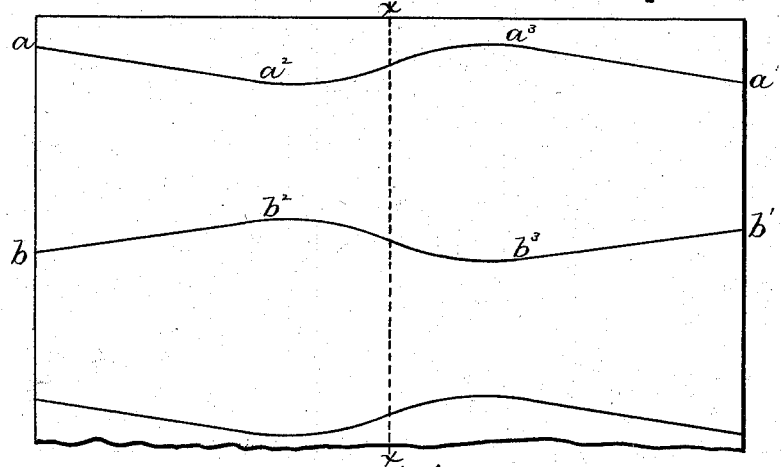
Figure 7:
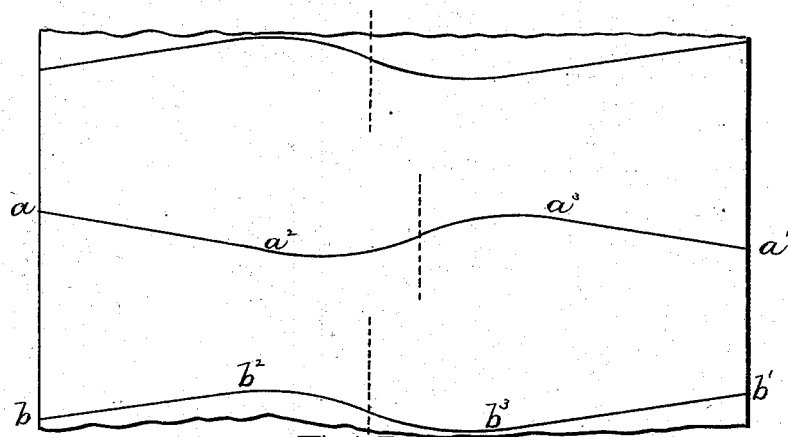
Figure 8:
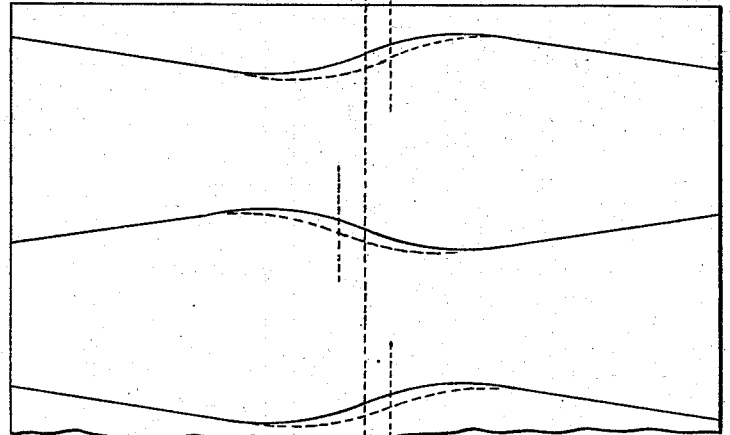

Of the accompanying drawings, forming a part of this specification, Figure 1 represents a side elevation of a block sole cutting machine to which my improvements are applied. Fig. 2 represents a plan view of the parts of the said machine below the line 2 2 of Fig. 1. Fig. 3 represents a section on line 3 3 of Fig. 2. Fig. 4 represents a plan view of the knife-holder. Fig. 5 represents a section on line 5 5 of Fig. 3. Fig. 6 represents a diagrammatic view showing the manner of cutting straight soles from a strip of leather. Fig. 7 represents a similar view showing the manner of cutting right and left soles. Fig. 8 represents a diagrammatic view illustrating the difference between the arrangement of the curves in straight and right and left soles.

The same letters of reference indicate the same parts in all the figures.

Referring first to Figs. 6, 7, and 8, which show parts of a strip of leather the width of which is equal to the length of the block-soles to be cut, $a\,a'$ and $b\,b'$ represent the lines along which the strip is cut to form the two edges of a block-sole, the cutting being performed by the coöperation of two knives with a cutting-bed, the knives being affixed to holders which are moved toward and from the cutting-bed by means hereinafter described. The knives are formed to produce a straight line in cutting from $a$ to $a^2$ and from $b$ to $b^2$, an ogee curve from $a^2$ to $a^3$ and from $b^2$ to $b^3$, and a straight line from $a^3$ to $a'$ and from $b^3$ to $b'$. In cutting straight soles the knives are adjusted so that a line $x\,x$ at right angles to the length of the sole will be at the center of the curves $a^2\,a^3\,b^2\,b^3$. In right and left soles, on the other hand, the center line of the curve $a^2\,a^3$ is offset from the center line of the curve $b^2\,b^3$, as shown in Fig. 6, the curvature and shape of the knives being the same in both cases.

In carrying out my invention I have made provision for adjusting the knives so as to bring the center lines of their curves in any desired position relatively to the ends of the soles, so that in cutting straight soles I make the center lines of the two knives coincide to produce the cut shown in Fig. 6, while in cutting right and left soles I offset the center line in one knife from that of the other, as shown in Fig. 7, the difference between the two positions being digrammatically illustrated in Fig. 8.

A and B represent the said knives, and C represents the cutting-bed. The knives are supported by beams E E, which are affixed to arms F F, the latter being pivotally connected at G G to the supporting-frame H. The beams are moved toward and from the cutting-bed by means of wrist-pins I, affixed to disks J on the power-driven shafts K, and rods L, connecting said wrist-pins with the ends of the beams. The mechanism thus far described is old and forms no part of my present invention.

Each beam E has a longitudinal slot E', into which projects the shank M' of a knife-carrier M, which is a plate or bar formed to bear against the under side of the beam E, the shank M' projecting upwardly from said plate or bar into the slot E' and being considerably shorter than said slot, as shown in Fig. 3, so that the knife-carrier can be adjusted longitudinally to enable the above-described change in the center line of the knife to be effected.

I provide a suitable adjusting device for the convenient longitudinal adjustment of the knife-carrier, said device, as here shown, comprising a screw-threaded bolt N, journaled in an ear N' on the beam E, and a nut O, affixed to the knife-carrier and engaged with said bolt.

P P represent clamps, which extend across the shank M' and slot E' and bear at their end portions upon the beam at opposite sides of the slot. Said clamps are secured to the shank M' by means of screws P', and when said screws are turned in one direction they cooperate with the clamp P in firmly binding the knife-carrier to the beam and thus securing it in any position to which it may be adjusted.

R represents a knife-holder, which is formed to bear upon the under surface of the knife-carrier M and has an upper face 2, in contact with the under surface of the knife-carrier, and a vertical face 3, against which the cutting-knife bears, as shown in Fig. 5, the knife being secured to said face by means of a clamping-plate 4 and screws 5.

The knife-holder R is pivotally connected to the knife-carrier M by means of a rod or bolt R', passing through the knife-holder and the carrier and provided at its upper end with a nut $R^2$, bearing upon the upper surface of the shank M' of the knife-carrier. The knife-holder is therefore adapted to be adjusted by turning it upon the pivot R', thus swinging one of its ends in one direction and the opposite end in the other direction to vary the relative widths of the toe and heel portions of the sole. I provide the knife-holder with an adjusting device whereby the described adjustment of the knife-holder on its pivot may be effected. Said device comprises a screw-threaded bolt S, journaled to rotate in bearings in the knife-carrier, and a nut S', located within a cavity in the knife-carrier and engaged with the threaded portion of the bolt S, said nut having a projection 6, which extends downwardly into a cavity 7 in the knife-holder R. It will be seen that by rotating the bolt S the nut S' will be moved crosswise of the knife-carrier, so that its projection 6 will cause the knife-holder to turn on its pivot in one direction or the other.

From the foregoing it will be seen that the knives may be adjusted so as to cut either straight or right and left soles, and that the proportions of the soles may be conveniently varied by the described adjustment of the knife-holder on its pivot. I thus enable one set of knives to be used for a variety of styles and sizes of block-soles, thus materially increasing the capabilities and enhancing the convenience of the machine.

I do not limit myself to the exact details of construction here shown and described for effecting the described adjustments, and may variously modify the same without departing from the spirit of my invention.

I claim—

1. In a block-sole-cutting machine, a beam movable toward and from the cutting-bed and provided with longitudinal guides, a knife-carrier extending parallel with said beam and adjustable on said guides, and means for positively securing the carrier to the beam in any position to which it may be adjusted.

2. In a block-sole-cutting machine, a beam movable toward and from the cutting-bed and provided with longitudinal guides, a knife-carrier extending parallel with said beam and adjustable on said guides, and an adjusting device connecting the beam with the carrier, whereby the carrier may be adjusted longitudinally on the beam.

3. In a block-sole-cutting machine, a beam movable toward and from the cutting-bed, a knife-carrier longitudinally adjustable on said beam, a knife-holder pivotally connected to the knife-carrier, and means for securing the holder to the carrier and the carrier to the beam in the different positions to which said carrier and holder may be adjusted.

4. In a block-sole-cutting machine, the combination of a cutting-bed, a longitudinally-slotted beam, means for moving the beam toward and from the cutting-bed, a knife-carrier seated on the under side of the beam and provided with a shank which is longitudinally adjustable in the slot of the beam, an adjusting device such as a screw journaled on the beam and a nut on the shank, whereby the carrier may be longitudinally adjusted, means for clamping the carrier to the beam in the different positions to which it may be adjusted, and a knife-holder suitably secured to said carrier.

5. In a block-sole-cutting machine, a beam movable toward and from the cutting-bed, a knife-carrier longitudinally adjustable on said beam, a knife-holder pivotally connected with said carrier, and an adjusting device on the carrier engaged with the knife-holder at one side of its pivot and adapted to turn the same on its pivot.

In testimony whereof I have signed my name to this specification, in the presence of two subscribing witnesses, this 26th day of June, A. D. 1895.

DAVID T. KNOX.

Witnesses:
 GEORGE W. MOULTON,
 WILLIAM LEES.